United States Patent
Byeon et al.

(10) Patent No.: US 11,844,339 B2
(45) Date of Patent: Dec. 19, 2023

(54) SINKER ASSEMBLY USING ELASTIC BODY

(71) Applicants: Jae Man Byeon, Cheonan (KR); Kyung A Jeong, Incheon (KR)

(72) Inventors: Jae Man Byeon, Cheonan (KR); Kyung A Jeong, Incheon (KR)

( * ) Notice: Subject to any disclaimer, the term of this patent is extended or adjusted under 35 U.S.C. 154(b) by 0 days.

(21) Appl. No.: 17/701,438

(22) Filed: Mar. 22, 2022

(65) Prior Publication Data
US 2022/0304294 A1    Sep. 29, 2022

(30) Foreign Application Priority Data

Mar. 24, 2021    (KR) .................. 10-2021-0037759

(51) Int. Cl.
*A01K 95/00* (2006.01)
*A01K 95/02* (2006.01)

(52) U.S. Cl.
CPC .............. *A01K 95/02* (2013.01); *A01K 95/00* (2013.01); *A01K 95/005* (2013.01)

(58) Field of Classification Search
CPC ....... A01K 95/00; A01K 95/005; A01K 95/02
USPC ................. 43/43.14, 44.92, 44.93, 44.95
See application file for complete search history.

(56) References Cited

U.S. PATENT DOCUMENTS

| | | | |
|---|---|---|---|
| 3,866,346 A * | 2/1975 | Schneider | A01K 93/00 43/44.87 |
| 4,561,206 A * | 12/1985 | Lowrance | A01K 91/00 43/43.11 |
| 4,693,030 A * | 9/1987 | Wohead | A01K 95/00 43/42.22 |
| 10,813,348 B2 * | 10/2020 | Bennis | A01K 91/03 |
| 2009/0249679 A1 * | 10/2009 | Huppert | A01K 95/00 43/44.99 |
| 2019/0216071 A1 | 7/2019 | Bennis | |

FOREIGN PATENT DOCUMENTS

| | | | |
|---|---|---|---|
| CN | 101543203 A | | 9/2009 |
| GB | 2284336 | * | 6/1995 |
| JP | 2019-071876 A | | 5/2019 |
| KR | 10-2004-0026728 A | | 4/2004 |
| KR | 101363323 B1 | | 2/2014 |
| KR | 10-2016-0039921 A | | 4/2016 |
| KR | 20-2016-0003565 U | | 10/2016 |

(Continued)

OTHER PUBLICATIONS

Notice of Allowance for Korean Patent Application No. 10-2021-0037759, dated May 24, 2022.

(Continued)

*Primary Examiner* — David J Parsley (57) ABSTRACT

Proposed is a sinker assembly that includes a holder section and a cap section, wherein the cap section includes a receptacle part coupling the holder section to the cap section, the receptacle part has an insertion hole, an elastic body located inside the receptacle part, and a pin portion protruding from an inner wall of the receptacle part to fix the elastic body, the holder section includes a fastening part, the fastening part has a first cutout cut in the longitudinal direction so that the pin portion is moved along the first cutout, a second cutout cut along the circumference so that the pin portion is moved along the second cutout, and a third cutout cut so that the pin portion is fixed thereto.

7 Claims, 10 Drawing Sheets

(56) References Cited

FOREIGN PATENT DOCUMENTS

| | | | |
|---|---|---|---|
| KR | 10-1964060 | B1 | 4/2019 |
| KR | 102158071 | B1 | 9/2020 |
| KR | 10-2020-0116800 | A | 10/2020 |
| KR | 10-2230232 | B1 | 3/2021 |

OTHER PUBLICATIONS

The Office Action for Chinese Patent Application No. 202210290552.5, dated Jul. 6, 2023.

\* cited by examiner

SINKER ASSEMBLY USING ELASTIC BODY

CROSS REFERENCE TO RELATED APPLICATION

The present application claims priority to Korean Patent Application No. 10-2021-0037759, filed on Mar. 24, 2021, the entire contents of which is incorporated herein for all purposes by this reference.

BACKGROUND OF THE INVENTION

Field of the Invention

The present disclosure relates to a sinker assembly using an elastic body.

Description of the Related Art

Equipment necessary for fishing is called fishing equipment. In general, the fishing equipment has four main components, and among them, a sinker or fishing weight serves to sink fishing fittings, including floats and hooks attached to the fishing lines, into the water. The sinker also plays the role of fixing the fishing fittings in the desired place by balancing the buoyancy (rising force) and gravity (falling force) on the fishing floats, hooks, line, and the like.

Sinker assemblies having various structures have been introduced to facilitate such balancing operation. Among them, there are sinker assemblies disclosed in Korean Patent Nos. 10-1363323 and 10-2158071.

In Patent No. 10-1363323, a sinker assembly is provided in which a cap section and a holder section are coupled in a screw-fastening manner. This type of coupling structure is a structure in which the cap section and the holder section are fastened by turning the cap section or holder section several times, so there is a problem in that the weight of the sinker assembly cannot be changed quickly.

In Patent No. 10-2158071, a sinker assembly adopts a one-touch coupling method to solve the above-mentioned problem. However, this method also has the following problems.

Figure 1A:
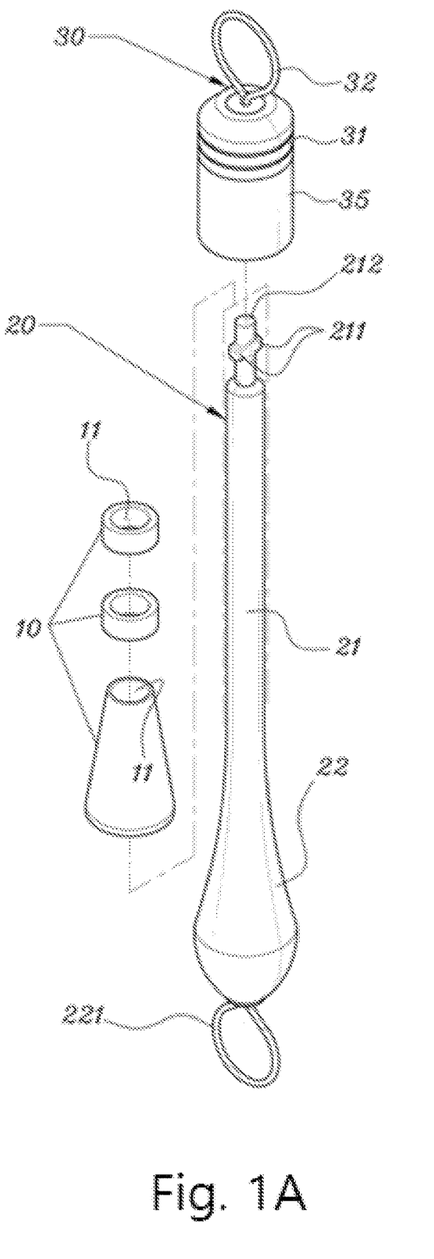
FIG. 1A is an exploded perspective view illustrating a conventional sinker assembly.
Figure 1B:
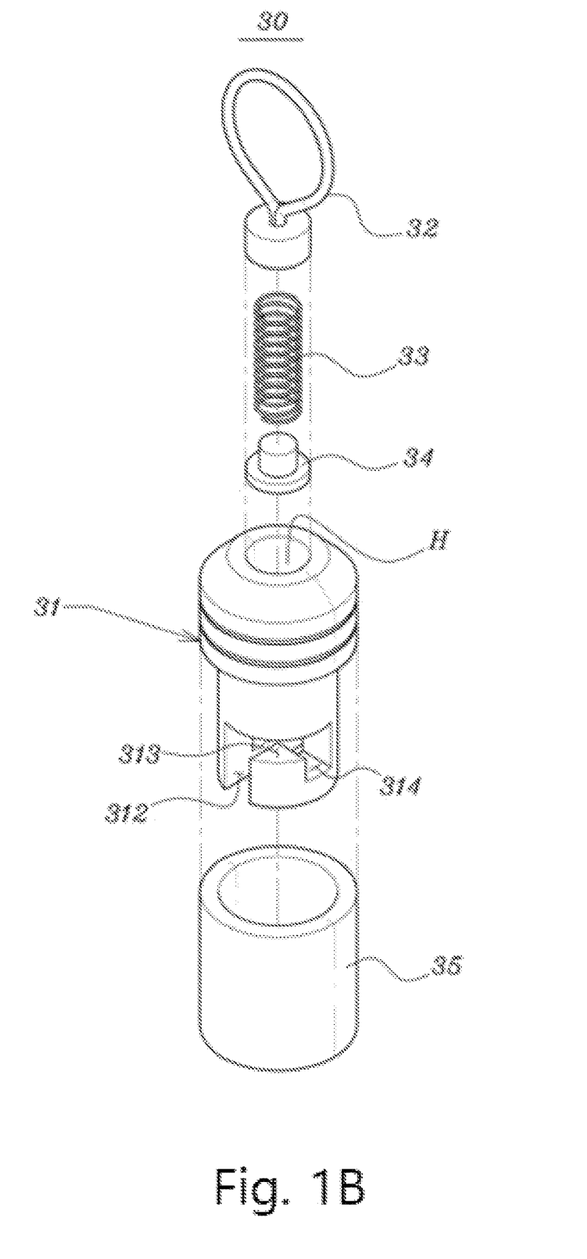
FIG. 1B is an exploded perspective view illustrating a connection socket of the conventional sinker assembly.

FIG. 1A is an exploded perspective view illustrating the one-touch coupling type sinker assembly disclosed in Patent No. 10-2158071. FIG. 1B is an exploded perspective view illustrating a connection socket of the sinker assembly. The one-touch coupling type sinker assembly includes a connection socket 30 and a sinker holder 20, wherein the sinker holder 20 has a locking wing part 211 and an upper protrusion 212. In this structure, the connection socket has a wider hole configuration, since the connection socket 30 needs to have, on the lower side thereof, a vertical cutout 312 in which the locking wing part 211 is to be inserted, in addition to a circular hole in which the upper protrusion 212 is to be inserted. At this time, when the locking wing part 211 is attempted to be coupled so as not to correspond to the vertical cutout 312, the locking wing part 211 is likely to be caught in a portion other than the circular hole at the end of the connection socket 30, making it difficult to be coupled in position.

A related study is needed to change the weight of a sinker more easily and quickly in a complex outdoor environment.

The foregoing is intended merely to aid in the understanding of the background of the present disclosure, and is not intended to mean that the present disclosure falls within the purview of the related art that is already known to those skilled in the art.

DOCUMENTS OF RELATED ART

Patent Documents (Patent Document 1) Korean Patent No. 10-1363323, and
(Patent Document 2) Korean Patent No. 10-2158071

SUMMARY OF THE INVENTION

Accordingly, the present disclosure has been made keeping in mind the above problems occurring in the related art, and an objective of the present disclosure is to provide a sinker assembly having a coupling structure in which a cap section and a holder section are stably coupled through minimal rotation of the cap section or holder section without screw-coupling therebetween in such a manner as to simultaneously fix an elastic body inside the cap section and couple the cap section and the holder section together using a single pin structure.

In an aspect of the present disclosure, a sinker assembly includes a holder section penetrating through a sinker having a through-hole therein, and a cap section connected to one end of the holder section to prevent disconnection of the sinker from the holder section, wherein the cap section includes a cap gripper part to be gripped to rotate the cap section, and a receptacle part coupling the holder section to the cap section, wherein the receptacle part is provided with an insertion hole provided on one side of the receptacle part and into which the holder section is introduced, an elastic body located inside the receptacle part to transmit a force in a direction toward an inlet side of the insertion hole, and a pin portion protruding from an inner wall of the receptacle part at an end side of the elastic body to fix the elastic body, wherein the holder section includes a fastening part located on one side of the holder section, and a holder gripper part located on the other side of the holder section so as to be gripped to rotate the holder section, wherein the fastening part is provided with a first cutout cut in the longitudinal direction of the holder section so that the pin portion is moved along the first cutout, a second cutout cut along the circumference of the holder section so that the pin portion is moved along the second cutout from an end side of the first cutout, and a third cutout cut from an end side of the second cutout so that the pin portion is fixed thereto in such a manner that a restoring force of the elastic body pushes the end side of the fastening part so that the pin portion is fixed by the third cutout.

The receptacle part may be further provided with an inclined portion formed by cutting an outer circumferential surface of the receptacle part so that an outer diameter of the receptacle part gradually decreases from the end side of the receptacle part to the insertion hole.

The cap gripper part and the holder gripper part may have a prismatic shape so that the cap section and the holder section are relatively rotated in opposite directions without sliding.

The pin portion may be formed singly in the receptacle part to prevent the elastic body from being disconnected from the cap section, and the pin portion may be formed to be moved to and coupled with the third cutout along the first cutout and the second cutout of the fastening part, thereby simultaneously preventing disconnection between the cap section and the holder section.

The cap gripper part may further include a rotatable upper ring, and the holder gripper part further includes a rotatable lower ring.

The holder section may further include a pillar-shaped sinker fixing part penetrating through the sinker, a sinker coupling part located on one side of the sinker fixing part, and a sinker support part connected to the sinker coupling part to support the sinker.

The holder section may further include a sinker coupling part capable of being screw-coupled with the sinker, and the thread direction of the sinker coupling part is opposite to the rotation direction in the process of connecting the cap section to the holder section when viewed from the end side of the holder section so that the sinker is able to be coupled to the sinker coupling part.

In an aspect of the present disclosure, a sinker assembly includes a first member including a receptacle part having an insertion hole provided on one side of the receptacle part, an elastic body located inside the receptacle part to transmit a force in a direction toward an inlet side of the insertion hole, and a pin portion protruding from an inner wall of the receptacle part at an end side of the elastic body to fix the elastic body, and a second member including a fastening part having a first cutout cut in the longitudinal direction so that the pin portion is moved along the first cutout, a second cutout cut horizontally along the circumference of the fastening part so that the pin portion is moved along the second cutout from an end side of the first cutout, and a third cutout cut from an end side of the second cutout so that the pin portion is fixed thereto in such a manner that a restoring force of the elastic body pushes the end side of the fastening part so that the pin portion is fixed by the third cutout.

The present disclosure can provide the effect of stably coupling the cap section and the holder section through minimum rotation of the cap section or the holder section without screw-coupling therebetween.

The present disclosure can provide the effect of intuitively introducing the holder section into the insertion hole formed in the cap section before the cap section is rotated, by forming a pin and groove in the cap section and the holder section, respectively.

The present disclosure can provide the effect of connecting the cap section and the holder section by the operation of the pin moving the first and second cutouts and being seated on the third cutout by means of the restoring force of the elastic body.

The present disclosure can provide the effect of easily introducing the holder section into the insertion hole of the cap section by forming the inner diameter of the cap section to be similar to the outer diameter of the holder section or forming the inclined portion in the insertion hole.

The present disclosure can provide the effect of rotating the cap section or holder section without slippage by forming the cap gripping portion and the holder gripping portion in a prismatic shape so that even a small sinker assembly can be easily assembled and disassembled.

The present disclosure can provide the effect of performing the coupling function using a simple structure in which the elastic body inside the cap section is fixed by the single pin and the elastic body transmits a load to the pin so as to fix the cap section to the holder section.

The present disclosure can provide the effect of easily connecting two or more members, such as the first member and the second member, by employing the receptacle part and the fastening part as a connection structure.

Accordingly, the present disclosure can provide the effect of quickly and easily replacing the sinker of the sinker assembly.

BRIEF DESCRIPTION OF THE DRAWINGS

The above and other objectives, features and advantages of the present disclosure will be more clearly understood from the following detailed description when taken in conjunction with the accompanying drawings, in which.

DETAILED DESCRIPTION OF THE INVENTION

Hereinbelow, a sinker assembly according to embodiments of the present disclosure will be described in detail with reference to the accompanying drawings.

Although not clearly described or illustrated herein, those of ordinary skill in the art can develop various devices that embody the principles of the invention and are included in the concept and scope of the invention. In addition, it should be understood that all conditional terms and embodiments listed herein are, in principle, expressly intended only for the purpose of understanding the inventive concept and are not limited to the specifically enumerated embodiments and states.

The above objectives, features and advantages will become more apparent through the following detailed description of the invention in conjunction with the accompanying drawings, and accordingly, those skilled in the art to which the invention pertains will be able to easily practice the technical idea of the invention.

Embodiments described herein will be described with reference to cross-sectional and/or perspective views, which are ideal illustrative views of the present disclosure. The thicknesses of films and regions illustrated in these drawings are exaggerated for effective description of technical contents. The illustrative drawings may be modified in shape due to manufacturing methods and/or tolerance. Accordingly, embodiments of the present disclosure are not limited to the specific form shown, but also include changes in the form generated according to the manufacturing process.

While describing various embodiments, components performing the same function will be given the same names and the same reference numbers for convenience even if the embodiments are different. In addition, configurations and operations already described in other embodiments will be omitted for convenience.

Figure 8:
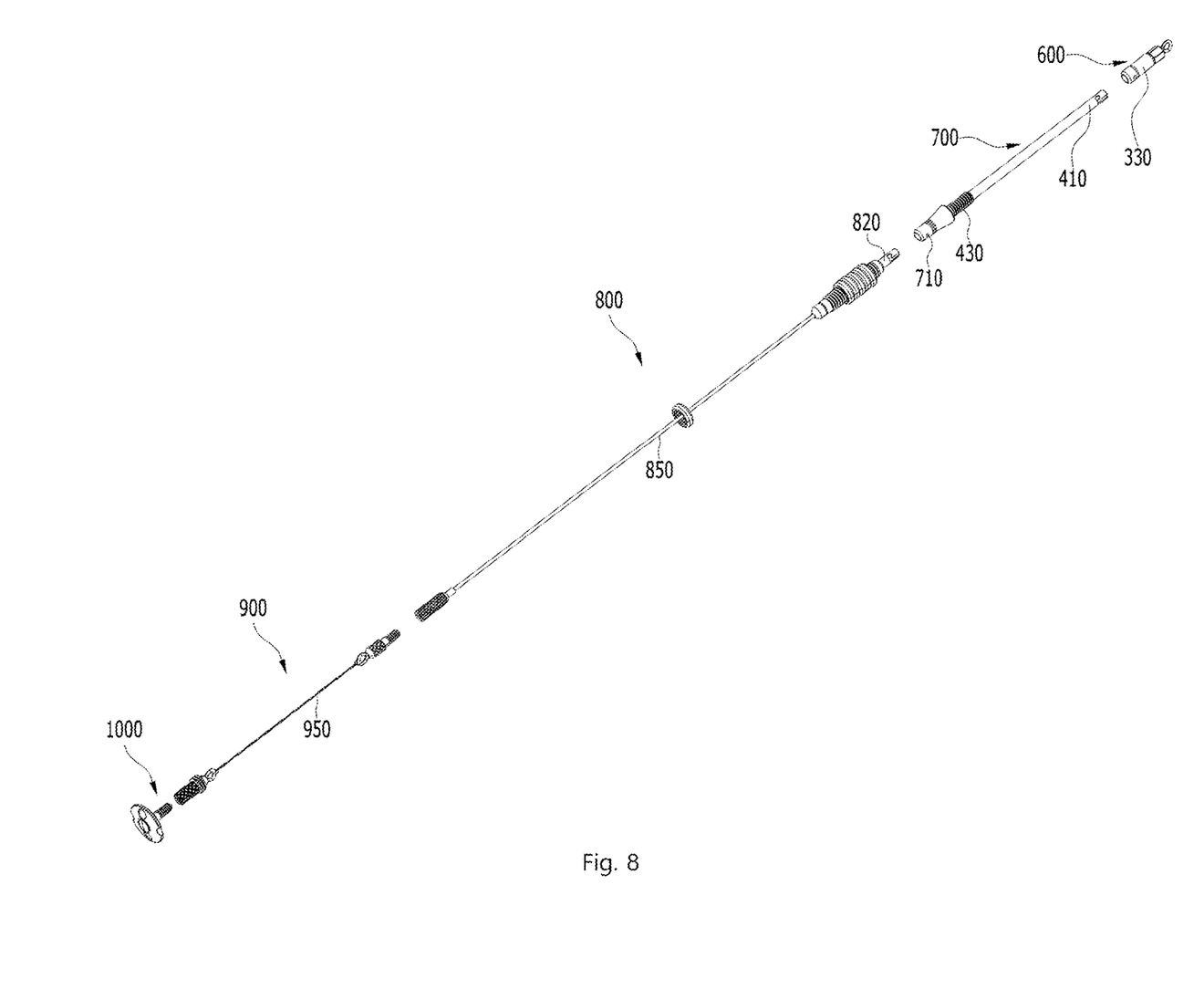
FIG. 8 is an exploded perspective view illustrating a sinker assembly using an elastic body composed of a first member to a fifth member according to an embodiment of the present disclosure.

FIG. 8 is an exploded perspective view illustrating a sinker assembly using an elastic body composed of a first member 600 to a fifth member 1000 according to an embodiment of the present disclosure. In an embodiment of the present disclosure, the first member 600 to the fifth member 1000 may be connected. However, the present disclosure is not necessarily limited to the disclosed number of the members, but may be implemented to only have the first member 600 and the second member 700, or otherwise may be implemented to additionally have a sixth member or more.

Prior to describing the connection method between the various members, the coupling structure of the first member 600 and the second member 700, which is a basic coupling structure, will first be described. A method of coupling the first member 600 as a cap section 300 and the second member 700 as a holder section 400 will be described.

Figure 2:
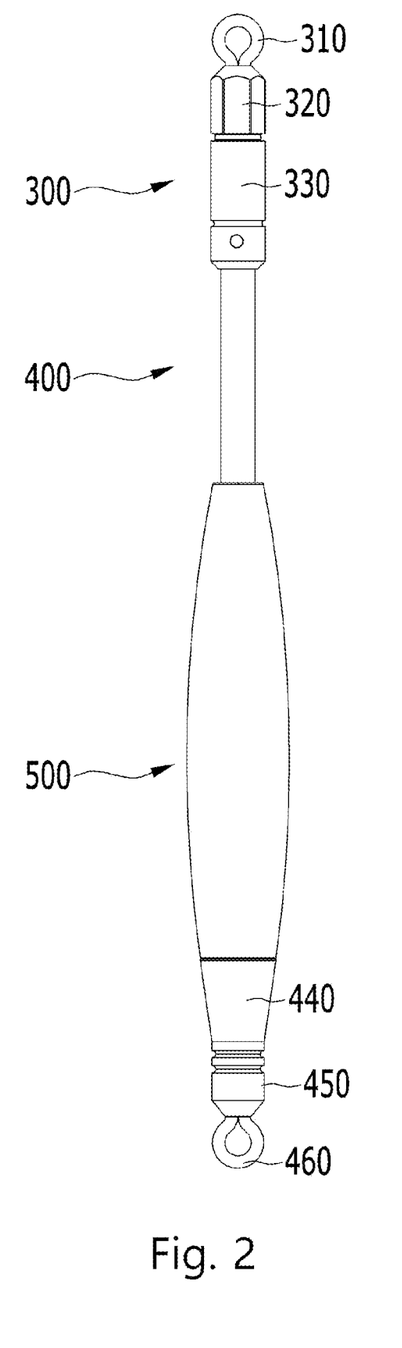
FIG. 2 is an assembly view illustrating a sinker assembly using an elastic body according to an embodiment of the present disclosure.
Figure 3:
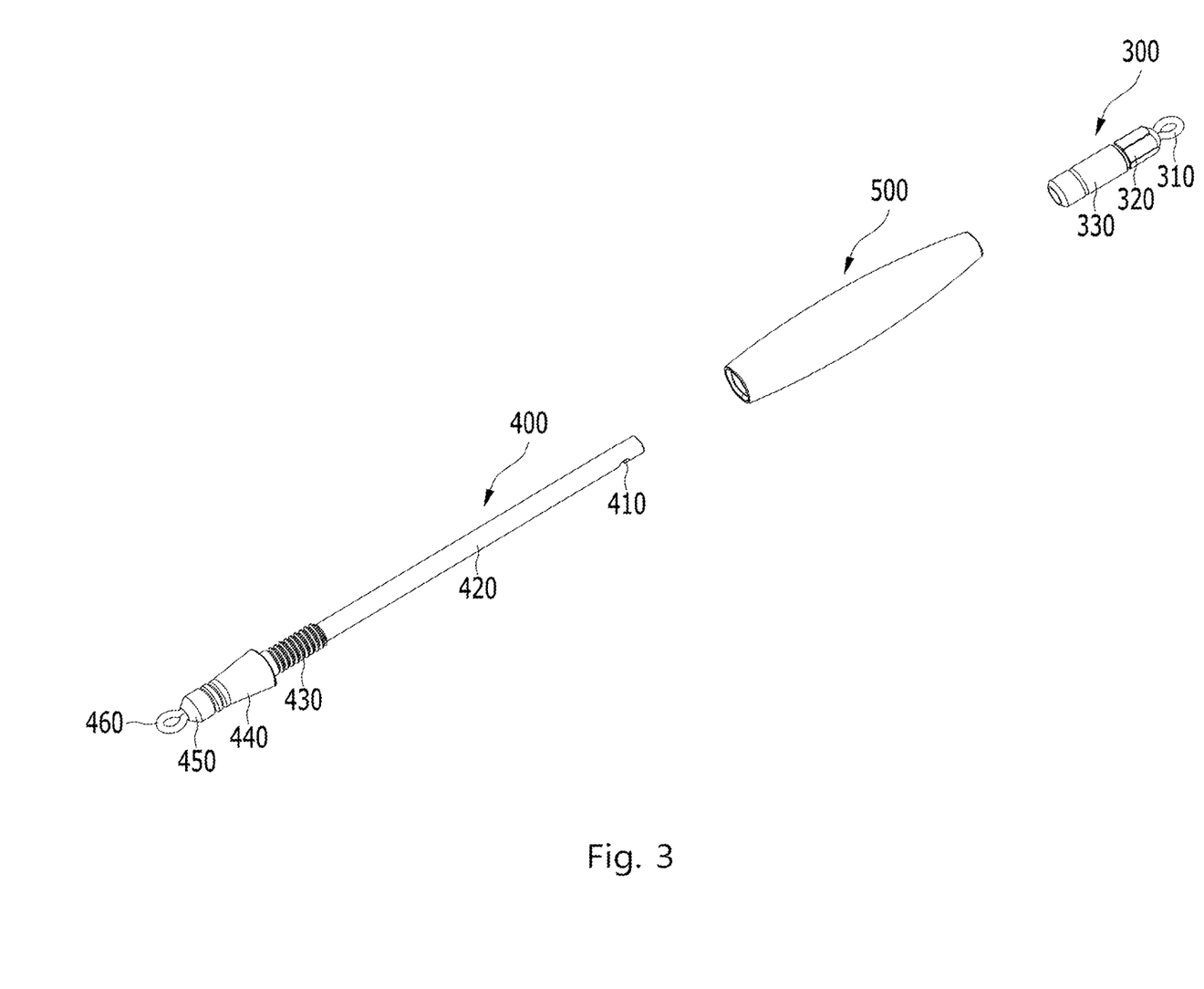
FIG. 3 is an exploded perspective view illustrating the sinker assembly using the elastic body according to the embodiment of the present disclosure.

FIG. 2 is an assembly view illustrating a sinker assembly using an elastic body according to an embodiment of the present disclosure, and FIG. 3 is an exploded perspective view illustrating the sinker assembly using the elastic body according to the embodiment of the present disclosure.

Referring to FIGS. 2 and 3, the sinker assembly using the elastic body 331 according to the embodiment of the present disclosure may include a holder section 400 penetrating a sinker 500 having a through-hole therein, and a cap section 300 connected to one side of the holder section 400 to prevent disconnection of the sinker 500 from the holder section 400.

The cap section 300 may have a cap gripper part 320 that can be gripped to rotate the cap section 300, and a receptacle part 330 through which the holder section 400 is coupled.

The sinker 500 may have a through-hole, through which the holder section 400 is inserted so that the sinker is not shaken in the horizontal direction. The sinker 500 is an element of a fishing fitting that can position a float in a desired place while resisting the rise of the float occurring due to buoyancy. At this time, the sinker 500 may have various weights.

The holder section 400 penetrates through the through-hole of the sinker 500 so as to fix the sinker 500 in the horizontal direction. At this time, the sinker 500 may be vertically fixed to the holder section 400 or may be vertically movable along the holder section.

The cap section 300 may be connected to the holder section 400 to prevent the sinker 500 from being disconnected from the holder section 400. The shape of the cap section 300 is not necessarily limited to that disclosed in the embodiment, but may vary in diverse forms.

The cap gripper part 320 may be positioned on the cap section 300 so that a user grips the cap gripper part to receive a rotational force by his/her hand. Since the fishing site is outdoors, the angler's hands may be smeared with foreign substances and the angler may wear gloves during fishing with the fishing rod. Even in such a situation, the cap gripper part 320 can be easily gripped so as to receive a rotational force. The position of the cap gripper part 320 is preferably located at the upper side of the receptacle part 330 according to an embodiment of the present disclosure without limitation thereto.

The receptacle part 330 is located on the cap section 300 and has a through-hole, through which the holder section 400 is inserted and fastened.

Figure 4:
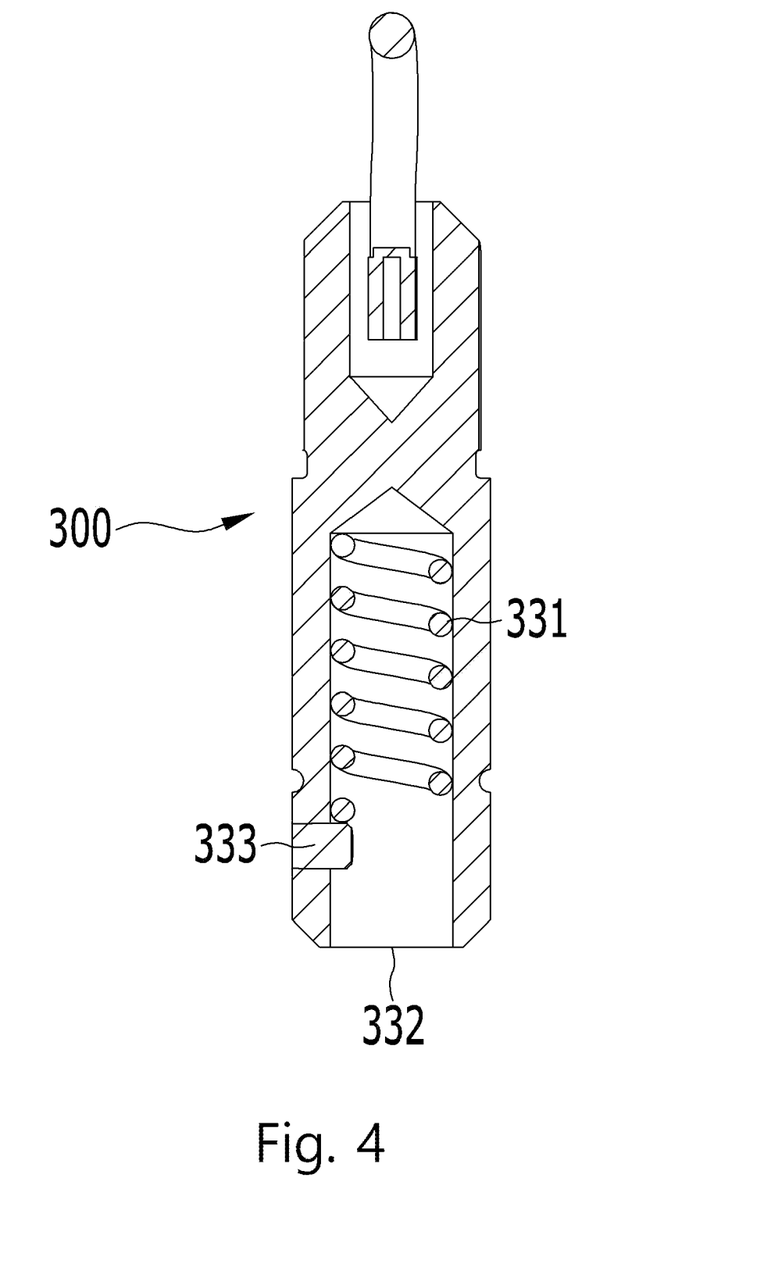
FIG. 4 is a cross-sectional view illustrating a receptacle part according to an embodiment of the present disclosure.

FIG. 4 is a cross-sectional view illustrating a receptacle part according to an embodiment of the present disclosure. Referring to FIG. 4, the receptacle part 330 may have an inlet-side insertion hole 332, into which the holder section 400 is inserted, an elastic body 331 that is located inward the insertion hole 332 to provide an elastic force toward an inlet of the insertion hole 332, and a pin portion 333 protruding inwardly from an inner wall of the insertion hole 332 at the rear end of the elastic body 331 to fasten the elastic body 331.

The elasticity of a material refers to a property of returning to an original shape after the material has been deformed, and the elastic body 331 refers to an object having this property. In embodiments of the present disclosure, the elastic body 331 employs a spring without limitation thereto.

The elastic body 331 is located inward the insertion hole 332 and is operated such that it is compressed by being pushed by the end of the holder section 400 when inserted into the insertion hole 332, and it returns to its original shape by a restoring force when the holder section 400 is pulled out.

The pin portion 333 may be formed to protrude from the inner wall of the insertion hole 332 to prevent the elastic body 331 from being disconnected from the receptacle part 330.

Figure 5:
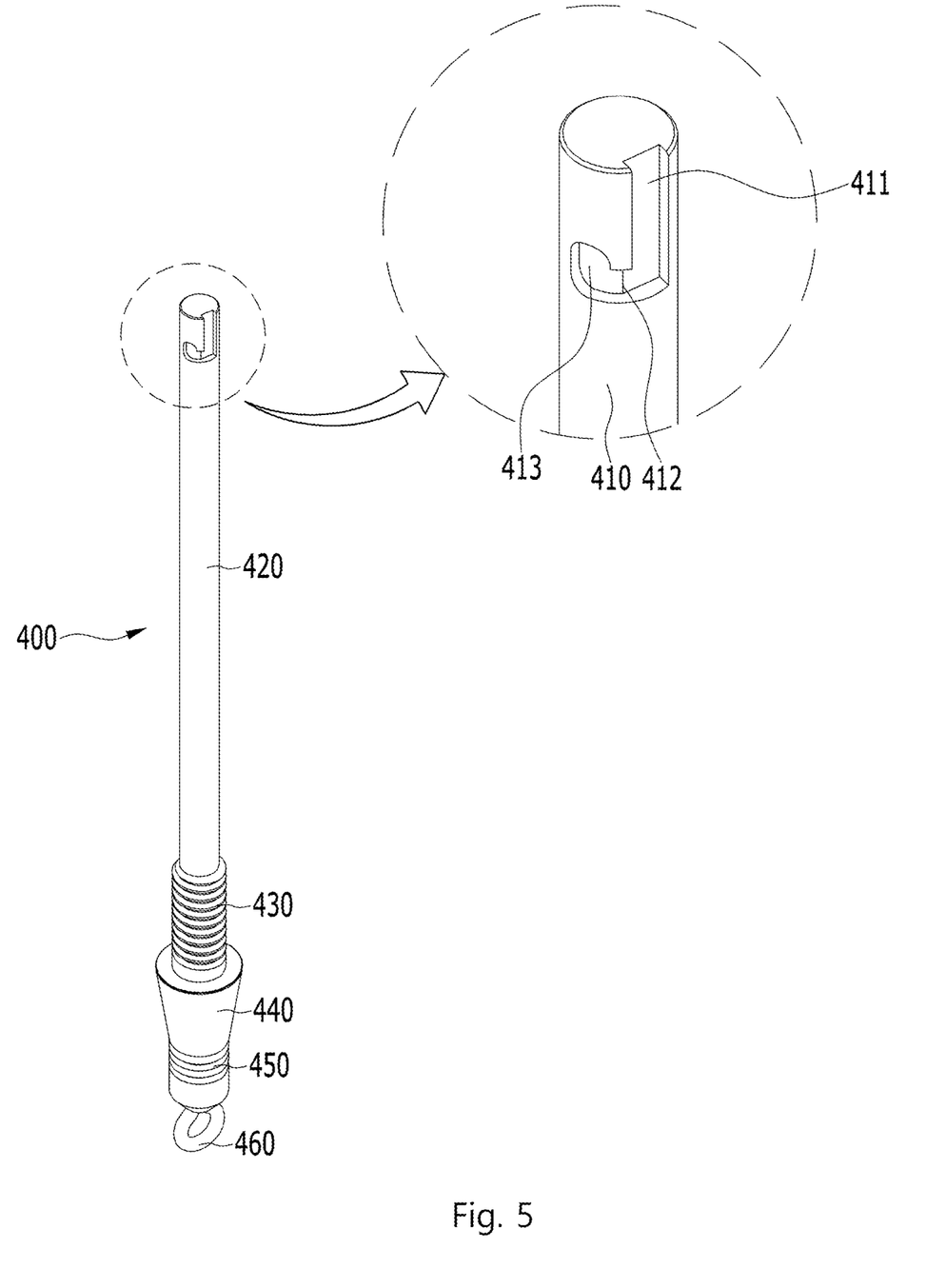
FIG. 5 is a perspective view illustrating a fastening part according to an embodiment of the present disclosure.

FIG. 5 is a perspective view illustrating a fastening part 410 according to an embodiment of the present disclosure. Referring to FIG. 5, the holder section 400 includes a fastening part 410 located at one end of the holder section 400, and a holder gripper part 450 located at the other end of the holder section 400, which can be gripped to rotate the holder section 400.

The fastening part 410 includes a first cutout 411 cut in the longitudinal direction of the holder section 400 so that the pin portion 333 can move along the first cutout, a second cutout 412 cut in the circumferential direction of the holder section 400 from the end side of the first cutout 411 so that the pin portion 333 can move along the second cutout, and a third cutout 413 cut in the longitudinal direction of the holder section from the end side of the second cutout 412 so that the pin portion 333 can be fixed to the third cutout.

The holder section 400 may be formed in a column shape to prevent the sinker 500 from being moved in the horizontal direction.

The holder gripper part 450 may be positioned on the end side of the holder section 400 so that a user can grip the holder gripper part and provide a rotational force thereto. The holder gripper part 450 can be easily gripped at the fishing site and receive a rotational force, as described above with reference to the cap gripper part 320.

The fastening part 410 may be positioned on the end side of the holder section 400 and may be connected to the receptacle part 330 by the pin portion 333 when the holder section 400 is inserted into the receptacle part 330. The fastening part 410 may be partially cut out so that the pin portion 333 of the receptacle part 330 can be moved along and fixed to the cutout.

The first cutout 411 may be cut in the longitudinal direction of the holder section 400, i.e., toward the holder gripper part 450, from the end side of the holder section 400. The first cutout 411 may provide a path along which the pin portion 333 in the receptacle part 330 moves.

The second cutout 412 may be cut in the circumferential direction of the holder section 400 from the end side of the first cutout 411. Here, the second cutout 412 may provide a path along which the pin portion 333 in the receptacle part 330 moves. Since a right-handed screw (clockwise coupling) is generally used, a preferred embodiment of the second cutout can provide a structure cut in a clockwise direction when viewed from the end of the holder section 400 so that the pin portion can be fastened to the second cutout in the same direction as the right-handed screw. However, the present disclosure is not necessarily limited to the cutting direction, but the second cutout may have a structure cut in the counterclockwise direction depending on the situation.

The third cutout 413 may be cut in the longitudinal direction, i.e., in the end-side direction of the holder section 400 from the end side of the second cutout 412. The third cutout 413 provides a space in which the pin portion 333 in the receptacle part 330 is fixed after being moved through the first cutout 411 and the second cutout 412.

Hereinafter, the principle of the connection between the receptacle part 330 and the fastening part 410 will be described in detail.

Figure 6A:
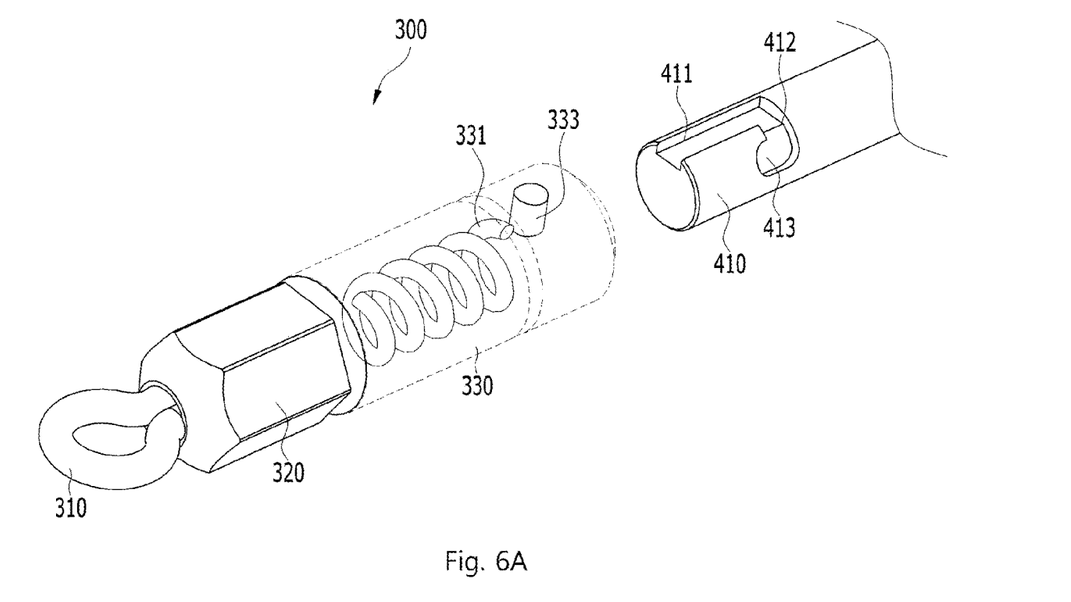
FIG. 6A is a perspective view illustrating a state in which the receptacle part and the fastening part are ready to be coupled together according to an embodiment of the present disclosure.

FIG. 6A is a perspective view illustrating a state in which the receptacle part 330 and the fastening part 410 are ready to be coupled together according to an embodiment of the present disclosure. Referring to FIG. 6A, it can be seen that the first cutout 411 is approaching the pin portion 333. At this time, the position of the pin portion 333 may or may not exactly coincide with the starting point of the first cutout 411. According to the embodiment of the present disclosure, in the case where the position of the pin portion 333 does not exactly coincide with the starting point of the first cutout 411, when the fastening part 410 of the holder section 400 is connected to the receptacle part 330 through the insertion hole 332, the end of the fastening part 410 is caught and stopped by the pin portion 333. In this case, the positions of the pin portion 333 and the first cutout 411 may coincide with each other by rotating the cap section 300 and/or the holder section 400 up to a full turn.

The embodiment of the present disclosure may provide a structure in which the fastening part 410 is intuitively inserted into the receptacle part 330 through the insertion hole 332 and then the cap section 300 and/or the holder section 400 is rotated with a simple hand operation so that the receptacle part 330 and the fastening part 410 can be connected together.

Figure 6B:
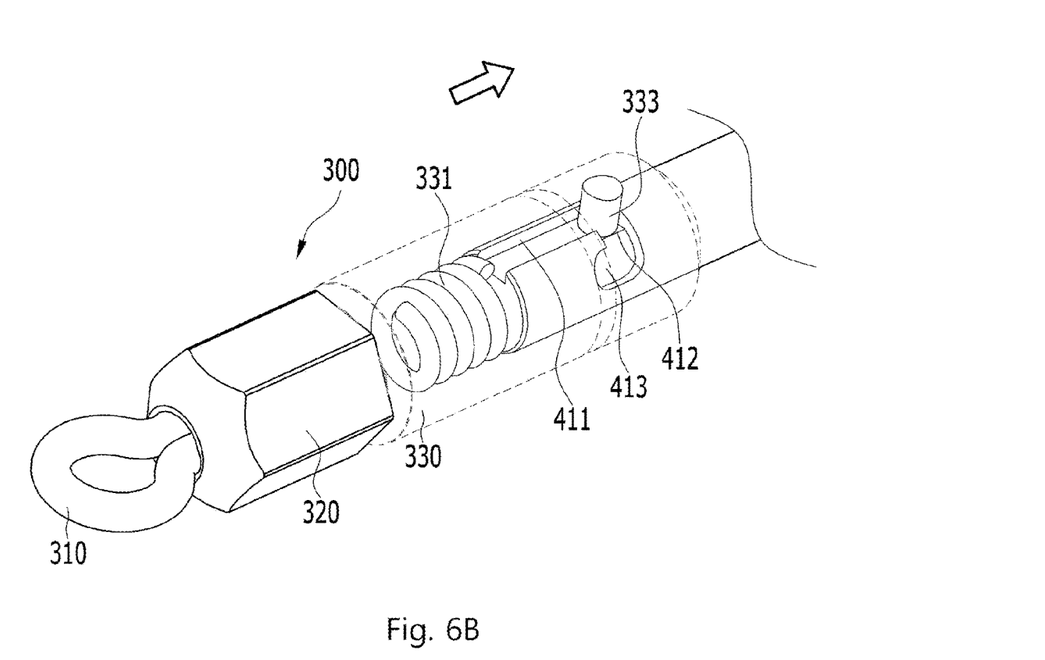
FIG. 6B is a perspective view illustrating a state in which a pin portion is moved along a first cutout according to an embodiment of the present disclosure.

FIG. 6B is a perspective view illustrating a state in which the pin portion 333 is moved along the first cutout 411 according to an embodiment of the present disclosure. Referring to FIG. 6B, when the cap section 300 and/or the holder section 400 is pushed in a state in which the position of the pin portion 333 and the starting point of the first cutout 411 coincide with each other, the pin portion 333 may reach the end side of the first cutout 411 (i.e., the starting point of the second cutout 412) along the first cutout 411 while the end side of the holder section pushes the elastic body 331.

Figure 6C:
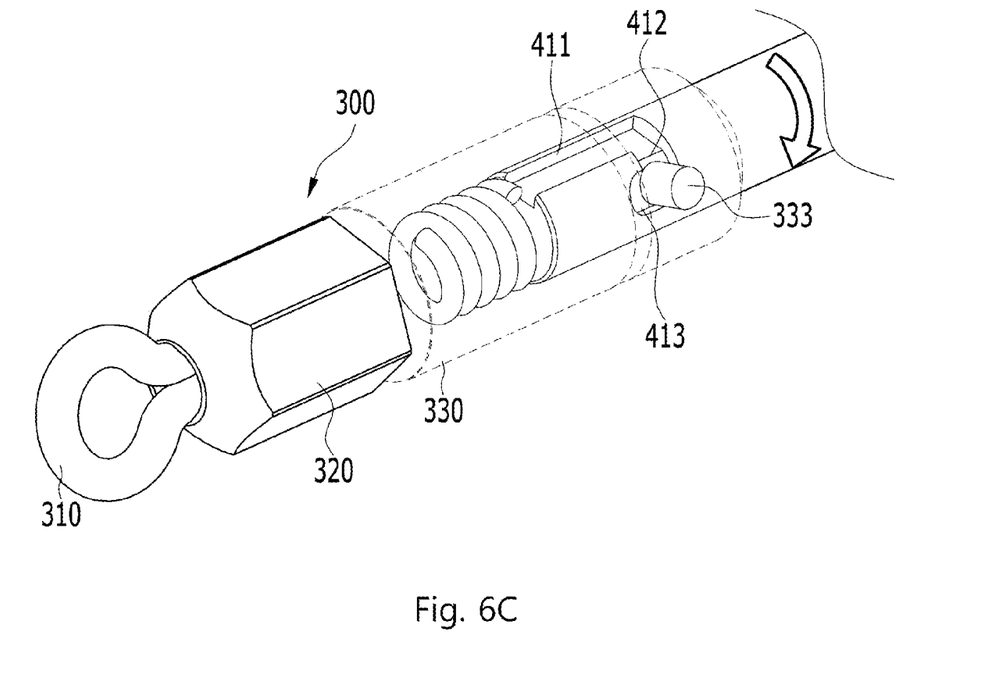
FIG. 6C is a perspective view illustrating a state in which the pin portion is moved along a second cutout according to an embodiment of the present disclosure.

FIG. 6C is a perspective view illustrating a state in which the pin portion 333 is moved along the second cutout 412 according to an embodiment of the present disclosure. Referring to FIG. 6C, when the cap section 300 and/or the holder section 400 is pushed in a state in which the pin portion 333 reaches the end point of the first cutout 411, the pin portion 333 may reach the end side of the second cutout 412 (i.e., the starting point of the third cutout 413) along the second cutout 412.

Figure 6D:
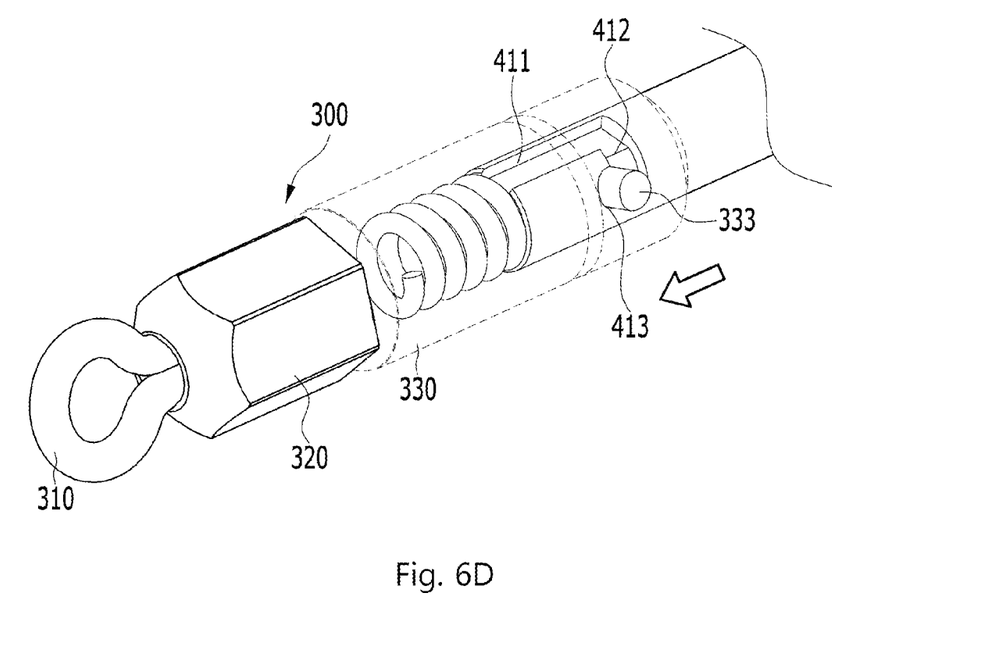
FIG. 6D is a perspective view illustrating a state in which the pin portion is fixed to a third cutout according to an embodiment of the present disclosure.

FIG. 6D is a perspective view illustrating a state in which the pin portion 333 is fixed to the third cutout 413 according to an embodiment of the present disclosure. Referring to FIG. 6D, when the external force is removed in a state in which the pin portion 333 reaches the end point of the second cutout 412, the elastic body 331 pushes the end side of the holder section 400 toward an inlet of the insertion hole 332 by restoring force. Then, the pin portion 333 is caught by the third cutout 413 to connect the receptacle part 330 and the fastening part 410 so that the cap section 300 and the holder section 400 are completely coupled. At this time, the elastic body 331 continuously pushes the end side of the holder section 400 and accordingly the pin portion 333 pushes the third cutout 413 in opposite direction of the pushing force of the elastic body 331, thereby maintaining a stable coupling state between the cap section and the holder section.

According to an embodiment of the present disclosure, the cap section 300 and the holder section 400 can be easily coupled through the structure of the receptacle part 330 and the fastening part 410 without screw-coupling therebetween. In addition, the coupling state can be maintained without being separated against an external force such as water.

In order to disconnect the cap section 300 from the holder section 400 for replacement of the sinker 500, the above-mentioned coupling process is reversely performed. When the holder section 400 and/or the cap section 300 are/is pushed in opposite direction, the elastic body 331 is compressed and the pin portion 333 is moved to the second cutout 412. Subsequently, when the holder section 400 and/or the cap section 300 are/is rotated, the pin portion 333 is moved along the second cutout 412 to the first cutout 411. Finally, when the external force is completely removed, the elastic body 331 pushes the end side of the holder section 400 with a restoring force and the pin portion 333 is moved along the first cutout 411, so that the cap section 300 is decoupled from the holder section 400.

The coupling and decoupling processes may be performed continuously. The final coupling may be achieved in one operation by simultaneously pushing the fastening part 410 of the holder section 400 into the receptacle part 330 so that the elastic body 331 is compressed and rotating the fastening part relative to the receptacle part. Conversely, the final decoupling may be achieved in one operation by simultaneously pushing the fastening part 410 of the holder section 400 into the receptacle part 330 so that the elastic body 331 is compressed and rotating the fastening part in opposite direction relative to the receptacle part.

The rotating direction may be clockwise or counterclockwise when viewed from the end side of the holder section along the horizontal path of the second cutout 412 described above.

The receptacle part 330 may be further provided with an inclined portion 340 formed by cutting the outer circumferential surface of the receptacle part 330 so that the outer diameter of the receptacle part 330 gradually decreases from the end side of the receptacle part 330 to the insertion hole 332.

The size of the insertion hole 332 of the receptacle part 330 may be determined according to the inner diameter of the receptacle part 330. When the outer diameter of the receptacle part 330 is excessively greater than the inner diameter, the cross-sectional area of the cap section (excluding the insertion hole) becomes greater, making it difficult to accurately find the position of the insertion hole in the process of inserting the holder section into the receptacle part. Rainy or windy fishing environments may make this discomfort more pronounced.

In the embodiment of the present disclosure, the inclined portion 340 may be provided to solve this problem.

Figure 7A:
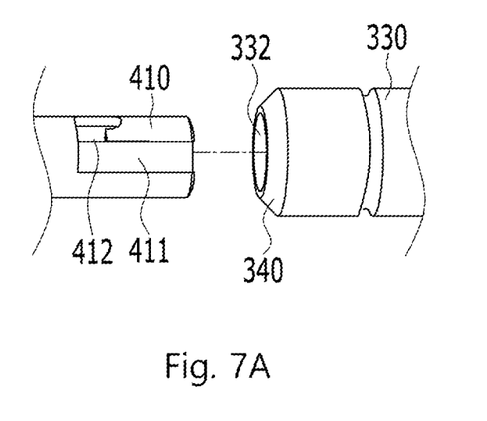
FIGS. 7A to 7C are comparative views illustrating the operations of the receptacle part and the fastening part according to an embodiment of the present disclosure, compared to a conventional embodiment.
Figure 7B:
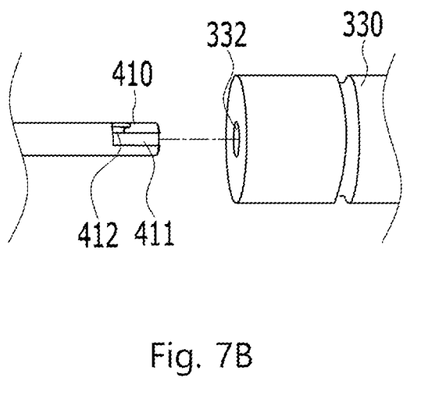
Figure 7C:
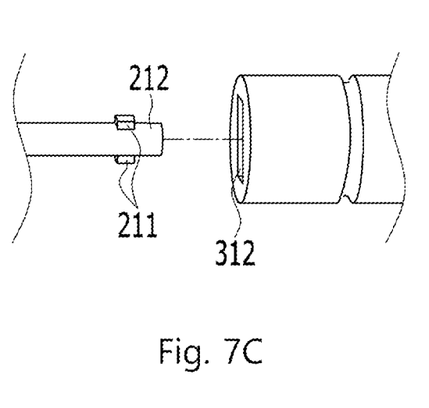

FIGS. 7A to 7C are comparative views illustrating the operations of the receptacle part 330 and the fastening part 410 according to an embodiment of the present disclosure, compared to a conventional embodiment. Referring to FIG. 7A, the receptacle part 330 may be further provided with an inclined portion 340 formed by cutting the outer circumferential surface of the receptacle part 330 so that the outer diameter of the receptacle part 330 gradually decreases from the end side of the receptacle part 330 to the insertion hole 332.

The inclined portion 340 may be formed on the end side of the receptacle part 330, thereby accurately showing the position of the insertion hole 332. Even in the case of the receptacle part 330 having the outer diameter excessively greater than the inner diameter, the inclined portion 340 allows the user to intuitively perceive the position of the insertion hole 332, thereby allowing the holder section 400 to be easily inserted into the receptacle part 330.

The inclined portion 340 may visually expose the insertion hole 332 so as to provide easy coupling between the holder section 400 and the cap section 300 even for a sinker assembly having a thick cap section 300.

Referring to FIG. 7B, the conventional structure suggests a shape having no inclined portion when the outer diameter is excessively greater than the inner diameter. At this time, the holder section easily hits a part other than the insertion hole (the cross-section of the cap section). According to the embodiment of the present disclosure, this problem can be solved by introducing the inclined portion 340 on the end side of the receptacle part 330.

Referring to FIGS. 1A, 1B, and 7C, the conventional structure proposes a sinker holder 20 including a locking wing part 211 and an upper protrusion 212. In this case, inevitably, when viewed from the cross-sectional shape of the connection socket 30, the connection socket 30 further requires an additional groove such as a vertical cutout 312 so that the locking wing part 211 can be inserted therethrough. This configuration may suffer from the following difficulties in the process of introducing the sinker holder 20 into the insertion hole. When the upper protrusion 212 of the sinker holder 20 attempts to enter the edge or both ends of the vertical cutout 312, the locking wing part 211 is caught and stopped by the part other than the hole (the cross section of the connection socket 30), so that the locking wing part is difficult to approach the inside of the connection socket 30.

Even when the upper protrusion 212 of the sinker holder 20 attempts to approach the center of the vertical cutout 312, if the position of the locking wing part 211 formed in the sinker holder 20 does not correspond to the vertical cutout 312, it is difficult for the sinker holder 20 to be coupled with the connection socket 30. In addition, since the vertical cutout 312 has a sufficient space for the upper protrusion 212 to approach, the sinker holder 20 may attempt to approach the connection socket 30 at an angle. In this case, in consideration of the approach angle of the sinker holder 20 and whether the locking wing part 211 and the hole of the vertical cutout 312 correspond to each other, the coupling should be attempted again.

Unlike the conventional structure in which a cutout is introduced in the connection socket 30, the embodiment of the present disclosure employs a first cutout 411, a second cutout 412, and a third cutout 413 in the fastening part 410 located on the holder 400, thereby allowing the holder 400 to be easily inserted into the receptacle part 330. In addition, unlike the conventional structure in which the locking wing part 211 is introduced on the sinker holder 20, the present disclosure introduces the pin portion 333 in the receptacle part 330 located on the cap section 300, thereby allowing the holder 400 to be introduced into the receptacle part 330 through the insertion hole 332 without any obstruction.

In conclusion, according to the embodiment of the present invention, unlike the conventional structure in which the sinker holder 20 suffers from difficulties in the process of attempting to approaching the connection socket 30, the inclined portion 340 can visually show the position of the insertion hole 332, the holder section 400 can pass through the insertion hole 332 without any obstruction, and the holder section 400 can be coupled with the cap section 300 by receiving a rotational force.

According to an embodiment of the present disclosure, the cap gripper part 320 and the holder gripper part 450 may be formed in a prismatic shape so that the cap section 300 and the holder section 400 can be rotated in opposite directions without sliding.

The cap gripper part 320 and the holder gripper part 450 may externally receive a rotational force. When the cap gripper part 320 and the holder gripper part 450 have a cylindrical shape, it is difficult to apply a rotational force thereto due to sliding. The prismatic (pole) shape of the cap gripper part 320 and the holder gripper part allows the cap gripper part 320 and the holder gripper part to receive the rotational force without sliding. This effect is exhibited the same as in the case where user's hands are smeared with a foreign substance, or the user wears gloves.

The pin portion 333 is formed singly in the receptacle part 330 to prevent the elastic body 331 from being separated from the cap section 300, whereas the pin portion is formed to be moved to the third cutout 413 along the first cutout 411 and the second cutout 412 of the fastening part 410, thereby simultaneously performing a function of preventing separation of the cap section 300 and the holder section 400.

The related art provides the conventional structure in which a protrusion member coupled to the cutout and a member for fixing the elastic body are separately provided.

In the embodiment of the present disclosure, the pin portion 333 is formed singly in the receptacle part 330, thereby providing both functions of engaging the third cutout 413 and of preventing the elastic body 331 from being separated from the receptacle part 330. As such, the embodiment of the present disclosure can provide a structurally simple sinker assembly by introducing the pin portion 333.

The cap gripper part 320 may further include a rotatable upper ring 310, and the holder gripper part 450 may further include a rotatable lower ring 460.

In general, the sinker assembly may be connected to a fishing line. The upper ring 310 and the lower ring 460 provide a means for connecting the sinker assembly with the fishing line. Although positioned on the cap gripper part 320 and the holder gripper part 450, the upper ring 310 and the lower ring 460 may rotate independently of the cap gripper part 320 and the holder gripper part 450. With this structure, the upper ring 310 and the lower ring 460 can prevent twisting of the fishing line even in the event of external forces such as water and wind being applied.

The holder section 400 may further include a column-shaped sinker fixing part 420 penetrating through the sinker 500, a sinker coupling part 430 positioned on one side of the sinker fixing part 420, and a sinker support part 440 connected to the sinker coupling part 430 to support the sinker 500.

The sinker fixing part 420 prevents the horizontal movement of the sinker 500, and provides a path until the sinker 500 is coupled to the sinker coupling part 430 or separated from the holder section 400. The sinker fixing part 420 may be formed in a column shape with various lengths.

Since the fishing fitting including a fishing float, a sinker assembly, etc. has the inertia force smaller than that of a heavy sinker 500, when applied with an external force such as water, the fishing fitting moves relatively more easily than the sinker.

The sinker coupling part 430 may prevent the sinker 500 from moving up and down on the sinker fixing part 420.

The sinker coupling part 430 may be formed by screw coupling. In addition, in another embodiment of the present disclosure, the sinker coupling part may be formed in the same manner as the fastening part 410.

The sinker support part 440 may serve to support the sinker 500 by being connected to the sinker coupling part 430. The sinker support part 440 and the sinker 500 may have contact surfaces having the same contact area.

The holder section 400 further includes a sinker coupling part 430 capable of being screwed with the sinker 500, and the thread direction of the sinker coupling part 430 is formed such that the sinker 500 may be coupled to the sinker coupling part 430 in a direction opposite to the rotation direction as viewed from the end side of the holder section 400 in the process of connecting the cap section 300 to the holder section 400.

A clockwise direction to be described later is based on a view from the end side of the holder section 400. In general, when the cap section 300 and the holder section 400 are connected, the cap section 300 may rotate in a clockwise direction and the holder section 400 may rotate in a counterclockwise direction. On the other hand, when the sinker 500 is connected to the holder section 400 by the sinker coupling part 430, the sinker 500 rotates counterclockwise and the holder section 400 rotates clockwise.

That is, the rotation direction during connection between the cap section 300 and the holder section 400 may be opposite to the rotation direction during connection between the sinker 500 and the holder section 400. As a result, even when the hand holding the holder section 400 in the process of connecting the cap section 300 and the holder section 400 grips the sinker 500 instead of the holder gripper part 450, the sinker 500 is not disconnected from the holder section 400.

Specifically, in the process of coupling the cap section 300 and the holder section 400, the cap section 300 may rotate in a clockwise direction and the holder section 400 may rotate in a counterclockwise direction. At this time, even when one hand holds the sinker 500, the sinker 500 receives a counterclockwise rotational force and transmits the counterclockwise rotational force to the holder section 400, so the holder section 400 can rotate counterclockwise. In summary, the cap section 300 can be rotated clockwise by receiving a clockwise rotational force by one hand, and the sinker 500 transfers the counterclockwise rotational force received from the opposite hand to the holder section 400 so that the holder section 400 can rotate counterclockwise.

Contrary to this, when the second cutout 412 is cut in a counterclockwise direction, during connection, the cap section 300 and the holder section 400 may receive a force in the opposite direction.

As a result, according to the embodiment of the present disclosure, the cap section 300 and the holder section 400 can be easily connected even when the hand holding the holder section 400 grips the sinker 500 that is relatively wider than the holder gripper part 450.

Next, a connection method of connecting a first member 600 and a second member 700 or connecting a first member 600, a second member 700, and a third member 800 or more is described.

The embodiment of the present disclosure includes a first member 600 and a second member 700, wherein the first member has a receptacle part 330, wherein the receptacle part 330 is provided with a insertion hole 332 provided on one side of the receptacle part 330, an elastic body 321 located inside the insertion hole 332 to transmit a force toward an inlet of the insertion hole 332, and a pin portion 333 protruding from an inner wall of the receptacle part 330 at the end side of the elastic body 331 to fix the elastic body 331, wherein the second member includes a fastening part 410, wherein the fastening part 410 is provided with a first cutout cut in the longitudinal direction so that the pin portion 333 can be moved along the first cutout, a second cutout cut in the horizontal direction so that the pin portion 333 is moved from the end side of the first cutout along the second cutout, and a third cutout cut from the end side of the second cutout so that the pin portion 333 can be fixed thereto in such a manner that the restoring force of the elastic body 331 pushes the end side of the fastening part 410 so that the third cutout fixes the pin portion 333.

The first member 600 may include a cap section 300, a holder section 400, a pole line or a float fishing fitting, as one component constituting the fishing fittings. The first member 600 may have a structure connected to the second member 700, and may specifically include a receptacle part 330. The receptacle part 330 may include an insertion hole 332, an elastic body 331, and a pin portion 333 as described above.

The pole line may be formed in various lengths, and may include an O-ring or a swivel. The post line may be composed of a shape memory alloy, stainless steel, braided yarn, wire, or the like.

The float fishing fitting is to prevent twisting of the fishing fittings and may be formed in various lengths. In addition, it may be composed of various kinds of materials.

The second member 700 may include a cap section 300, a holder section 400, a pole line, or a float fishing fitting, as one component constituting the fishing fittings. The second member 700 may have a structure connected to the first member 600, and specifically may include a fastening part 410. The fastening part 410 may include a first cutout, a second cutout, and a third cutout as described above.

As an embodiment for coupling the first member 600 and the second member 700, the first member 600 may include the cap section 300, and the second member 700 may include the holder section 400. Conversely, the first member 600 may include the holder section 400, and the second member 700 may include the cap section 300. However, the present disclosure is not necessarily limited thereto, but may be configured by the connection of the holder section 400 and the pole line, and the connection of the pole line and the float fishing fitting.

Referring back to FIG. 3 to explain a representative embodiment of the present disclosure, according to a first embodiment, the first member 600 may be the cap section 300, and the second member 700 may be the holder section 400. The cap section 300 including the receptacle part 330 may be connected to the holder section 400 including the fastening part 410.

Figure 9A:
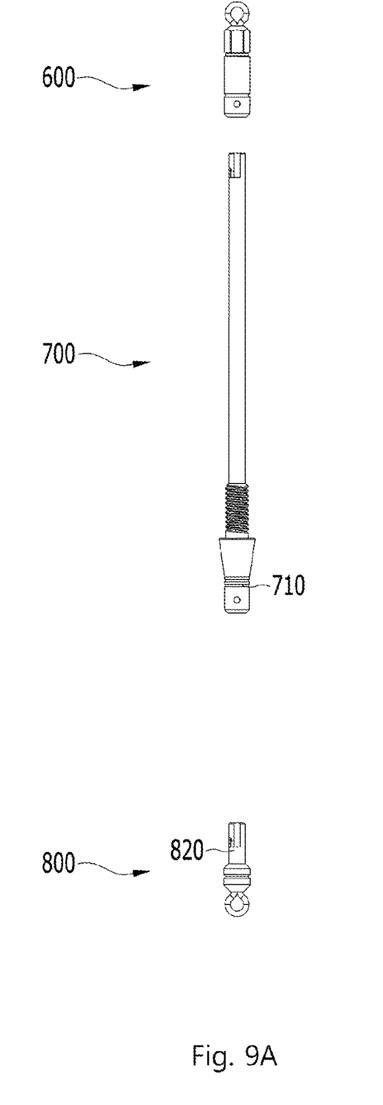
FIGS. 9A and 9B are exploded perspective views illustrating a sinker assembly using an elastic body composed of a first member to a third member according to an embodiment of the present disclosure.
Figure 9B:
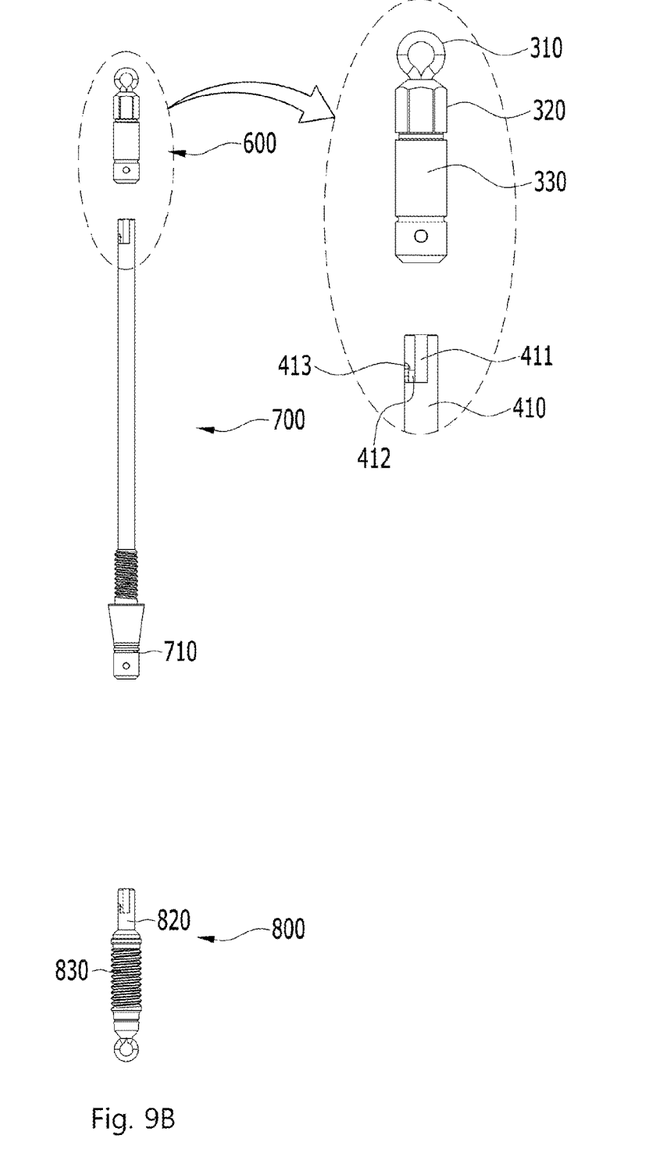

FIGS. 9A and 9B are exploded views illustrating a sinker assembly using an elastic body 331 composed of a first member 600 to a third member 800 according to an embodiment of the present disclosure. In this embodiment, the third member 800 may be connected to the second member 700.

The third member 800 may include a cap section 300, a holder section 400, a pole line or a float fishing fitting, as one component constituting the fishing fittings. In order for the third member 800 to be connected to the second member 700, the second member 700 may include a second receptacle part 710 having the same structure as the receptacle part 330 of the first member 600. The configuration of the receptacle part 330 of the first member 600 is the same as described above, so it will be omitted.

In addition, the third member 800 may include the second fastening part 820 having the same structure as the fastening part 410 of the second member 700. The configuration of the fastening part 410 of the second member 700 is the same as described above, so it will be omitted.

Referring to FIGS. 9A and 9B, according to a second embodiment, the third member 800 may include a second fastening part 820 at one end and a ring at the other end. In this case, the third member 800 may serve as a lower cap section corresponding to the cap section 300. A ring may be connected to a fishing line, a pole line, and the like.

In addition, the third member 800 may further include a weight part 830. The weight part 830 may serve as a gripping portion in the process of connecting the third member 800 to the second member 700. The weight part 830 may have various weights to provide additional weight to the sinker 500.

Referring back to FIG. 8, according to a third embodiment, the first member 600 may include the cap section 300, the second member 700 may include the holder section 400, the third member 800 may include a first post line 850, and the fourth member 900 may include a second post line 950. The fourth member 900 may be connected to the third member 800, the fifth member 1000 may be connected to the fourth member 900, and the fifth member 1000 may include a float fishing sinker. The float fishing sinker may have various weights to provide weight, and may connect various types of float fishing fittings.

Although the third embodiment illustrates the connection structure of the first member 600 to the fifth member 1000, the present disclosure is not necessarily limited to this structure. In the present disclosure, respective members can be modified in diverse forms, and the present disclosure can be implemented by connecting additional components of the sixth member or more.

In addition, as illustrated in the third embodiment, only the connection between the first member 600, the second member 700, and the third member 800 has the structure having the receptacle part and the fastening part according to the present disclosure, but the connection between the fourth member 900 and the fifth member 1000 adopts a screw coupling structure.

As such, all the connection structures between respective members do not necessarily have the structure having the receptacle part and the fastening part. The structure having the receptacle part and the fastening part according to the present disclosure can be adopted only for connection between some members. In this case, some of the connection structures may have various connection structures such as a screw coupling structure. That is, the present disclosure may have at least one receptacle part and at least one fastening part, and may adopt a connection structure between respective members in various ways depending on the situation.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A sinker assembly comprising:
   a holder section penetrating through a sinker having a through-hole therein; and
   a cap section connected to one end of the holder section to prevent disconnection of the sinker from the holder section,
   wherein the cap section includes a cap gripper part to be gripped to rotate the cap section, and a receptacle part coupling the holder section to the cap section,
   wherein the receptacle part is provided with an insertion hole provided on one side of the receptacle part and into which the holder section is introduced, an elastic body located inside the receptacle part to transmit a force in a direction toward an inlet side of the insertion hole, and a pin portion protruding from an inner wall of the receptacle part at an end side of the elastic body to fix the elastic body,
   wherein the holder section includes a fastening part located on one side of the holder section, and a holder gripper part located on the opposite side of the holder section so as to be gripped to rotate the holder section,
   wherein the fastening part is provided with a first cutout cut in a longitudinal direction of the holder section so that the pin portion is moved along the first cutout, a second cutout cut along a circumference of the holder section so that the pin portion is moved along the second cutout from an end side of the first cutout, and a third cutout cut from an end side of the second cutout so that the pin portion is fixed thereto in such a manner that a restoring force of the elastic body pushes the end side of the fastening part so that the pin portion is fixed by the third cutout.

2. The sinker assembly according to claim 1, wherein the receptacle part is further provided with an inclined portion formed by cutting an outer circumferential surface of the receptacle part so that an outer diameter of the receptacle part gradually decreases from the end side of the receptacle part to the insertion hole.

3. The sinker assembly according to claim 1, wherein the cap gripper part and the holder gripper part have a prismatic shape so that the cap section and the holder section are relatively rotated in opposite directions without sliding.

4. The sinker assembly according to claim 1, wherein the pin portion is formed singly in the receptacle part to prevent the elastic body from being disconnected from the cap section, and the pin portion is formed to be moved to and coupled with the third cutout along the first cutout and the second cutout of the fastening part, thereby simultaneously preventing disconnection between the cap section and the holder section.

5. The sinker assembly according to claim 1, wherein the cap gripper part further includes a rotatable upper ring, and the holder gripper part further includes a rotatable lower ring.

6. The sinker assembly according to claim 1, wherein the holder section further includes a pillar-shaped sinker fixing part penetrating through the sinker, a sinker coupling part located on one side of the sinker fixing part, and a sinker support part connected to the sinker coupling part to support the sinker.

7. The sinker assembly according to claim 1, wherein the holder section further includes a sinker coupling part capable of being screw-coupled with the sinker, and the thread direction of the sinker coupling part is opposite to the rotation direction in the process of connecting the cap section to the holder section when viewed from the end side of the holder section so that the sinker is able to be coupled to the sinker coupling part.

\* \* \* \* \*